United States Patent

Dias

[15] 3,697,899

[45] Oct. 10, 1972

[54] ACOUSTIC SURFACE WAVE TRANSMISSION DEVICE

[72] Inventor: Fleming Dias, Palo Alto, Calif.

[73] Assignee: Zenith Radio Corporation, Chicago, Ill.

[22] Filed: April 5, 1971

[21] Appl. No.: 131,192

[52] U.S. Cl. ........................333/30, 333/72, 310/8.1

[51] Int. Cl. ............................................H03h 7/30

[58] Field of Search ..........333/30, 30 M, 72; 310/8.1

[56] References Cited

UNITED STATES PATENTS

| | | | |
|---|---|---|---|
| 3,383,631 | 5/1968 | Korpel | 333/30 |
| 3,446,975 | 5/1969 | Adler et al. | 333/72 X |
| 3,302,136 | 1/1967 | Auld | 333/30 |
| 3,360,749 | 12/1967 | Sittig | 333/30 |

*Primary Examiner*—Herman Karl Saalbach
*Assistant Examiner*—Saxfield Chatmon, Jr.
*Attorney*—Francis W. Crotty

[57] ABSTRACT

A surface wave integratable filter includes input and output transducers spaced apart on an acoustic wave propagating medium. The input transducer launches acoustic surface waves along a path in which the wavefronts diverge. Disposed on the medium between the input and output transducers is an acoustic lens formed of a material that exhibits an acoustical refractive index greater than one. The lens acts to change the width of the acoustic wavefront and thereby enables appropriate selection of the physical size of the output transducer so as to obtain desired input and output impedances while securing increased efficiency of interaction at the output transducer.

11 Claims, 4 Drawing Figures

Inventor
Fleming Dias
By Francis W. Crotty
Attorney

ACOUSTIC SURFACE WAVE TRANSMISSION DEVICE

BACKGROUND OF THE INVENTION

The present invention pertains to surface wave integratable filters. More particularly, it relates to such filters in which an acoustic lens is employed to secure a desired wavefront width at the position along the propagation path at which the acoustic waves interact with an output transducer.

In U.S. Pat. No. 3,582,838, issued June 1, 1971 in the name of Adrian DeVries, and assigned to the assignee of the present application, there are disclosed and claimed a number of different acousto-electric devices in which acoustic surface waves propagating in a piezoelectric material interact with transducers coupled to the wave propagating surface. In general, an input transducer launches surface waves toward an output transducer which responds to the waves and develops an electrical output signal that is fed to a load. As therein disclosed, the input and output transducers comprise interleaved combs of conductive electrodes or teeth deposited upon a piezoelectric substrate which serves as the wave propagating medium.

It may, of course, be desirable to match the impedance of the input or output transducer to that of an adjoining stage in order to obtain maximum transfer of signal power. In electro-acoustic filters of the kind utilizing a piezoelectric ceramic material, the impedance presented across the transducers typically is a comparatively low value, for example of the order of 200 ohms. Generally speaking, the impedance of a surface-wave transducer depends upon the material on which the transducing electrodes are deposited, the number of electrodes, the length of the electrodes (the resulting width of the transducing device in a direction across the path of wave propagation) and the particular configuration of the pattern.

In the typical design of a surface-wave transducer, the number of different individual electrodes in the comb-array pair is dictated by the selectivity required. The material may be selected for its ease of fabrication and its particular wave propagation velocity as well as its coupling factor. The electrode spacing is thereupon dictated by that velocity and the wavelength of the signal to be transmitted. For a wavelength $\lambda_o$ at a frequency $f_o$ and with a propagation velocity $v_s$, the relationship is:

$$f_o\lambda_o = v_s\,.$$

The spacing between adjacent electrodes is one-half the acoustic wavelength in the material. The resulting capacitive reactance of a simple transducer is inversely proportional to the number of electrodes, and the parallel conductance is directly proportional to the square of that number. Within each comb array, the electrodes form N transducer pairs comprising a total of 2N half-wavelength transducer sections $n$. That is, $$2N = n\,,$$

and the number of electrodes is (n + 1) or (2N + 1). For further discussion of these different relationships, reference may be had to "Characteristics of Surface Wave Integratable Filters (SWIFS)," by DeVries et al., presented at the National Electronics Conference on Dec. 8, 1970.

To an extent, the transducer impedance can be decreased by increasing the length of the electrodes; in general the impedance is inversely proportional to that length. For a given electrode length of the input transducer, however, the effective length of the electrodes in an output transducer may be limited by the width of the acoustic wavefronts approaching it; further increase in the width of that output transducer, while decreasing impedance, leads to inefficiency of interaction.

Similarly, the transducer electrodes may be made shorter when it's desired to increase the impedance. However, as that length is decreased, there may result an increase in signal losses. Moreover, only that portion of the launched wave having a proper orientation with respect to the electrodes of the output transducer interacts usefully with that transducer. This along, because of wave divergence, places a limitation on both intertransducer spacings and relative transducer widths that may be efficiently employed. The limitation on intertransducer spacing precludes the use of greater distances for the purpose of reducing direct-coupled feed through of signal energy from the input to the output of the system.

In order to achieve a higher impedance across a transducer, while yet employing electrode lengths sufficient to limit divergence of the waves and thus obtain efficient transmission, copending application Ser. No. 752,073, filed Aug. 12, 1968, by Adler et al., now U.S. Pat. No. 3,600,710, discloses the concept of segmenting a transducer into a plurality of electrode arrays spaced transversely to the propagation path. By connecting the segmented transducers in series, the total transducer impedance is increased in proportion to the square of the number of segments, while efficiency of interaction is at the same time preserved. In some instances, however, such an arrangement results in narrowing the bandwidth undesirably, and it also imposes technological restraints in the fabrication of the filter.

It is, accordingly, a general object of the present invention to provide a surface-wave filter which overcomes one or more of the aforenoted difficulties, limitations and restraints.

It is another object of the present invention to provide a surface-wave filter in which maximum efficiency of wave interaction may be obtained while utilizing a transducer that may be optimized with respect to impedance.

A further object of the present invention is to provide a new and improved surface-wave filter in which the width of propagating wavefronts may be controlled or changed.

Still another object of the present invention is to provide a new and improved surface-wave filter in which the intertransducer spacing may be increased, as for reducing direct feedthrough, while avoiding losses caused by wave divergence.

SUMMARY OF THE INVENTION

A signal transmission device constructed in accordance with the present invention includes a medium propagative of acoustic surface waves. Means including an input transducer respond to input signals for launching acoustic surface waves along a predetermined path on the medium; the fronts of those waves have a width which changes during propagation. An acoustic lens, is disposed on the medium in the propagation path for modifying the wavefronts. Finally, means including an output transducer respond to the acoustic surface waves transmitted through the lens for developing an output signal.

BRIEF DESCRIPTION OF THE DRAWING

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENTS

Figure 1:
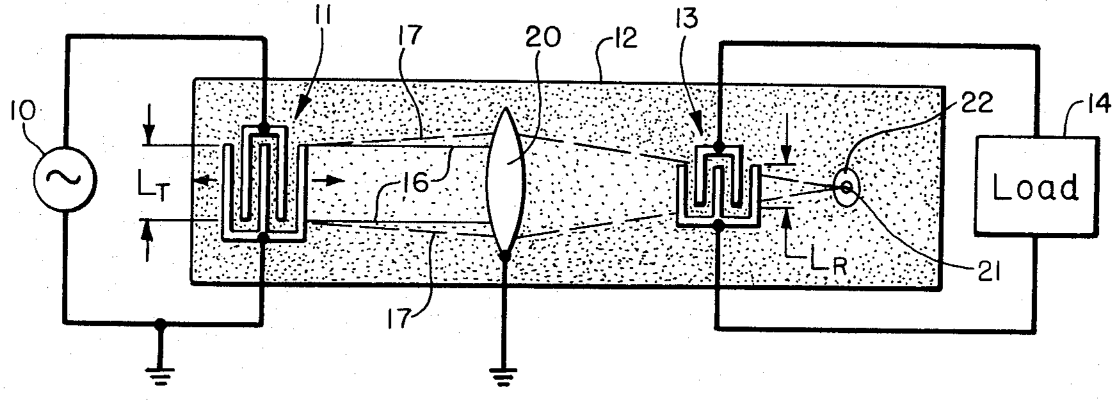
FIG. 1 is a diagram of one embodiment of a surface-wave filter.

In FIG. 1, a signal source 10 is connected across an input transducer 11 mechanically coupled to one major surface of a body of piezoelectric material in the form of a substrate 12. An output or second portion of the same surface of substrate 12 is, in turn, mechanically coupled to an output transducer 13 which is coupled across a load 14.

Ignoring for a moment other components illustrated in FIG. 1, transducers 11 and 13 are constructed as two comb-type electrode arrays. The stripes or conductive elements of one comb are interleaved with the stripes of the other. The electrodes are of a material, such as gold or aluminum, which may be vacuum deposited on a smoothly lapped and polished planar surface of the piezoelectric body. The piezoelectric material is one, such as PZT, quartz or lithium niobate, that is propagative of acoustic waves. The distance between the centers of two adjoining stripes in each array is one-half of the acoustic wavelength of the signal for which it is desired to achieve maximum response.

Direct piezoelectric surface-wave transduction is accomplished by the spatially periodic interdigital electrodes or teeth of transducer 11. Considering this device as a transmitter, a periodic electric field is produced when a signal from source 10 is fed to the electrodes and, through piezoelectric coupling, an electric signal is transduced to a traveling acoustic surface wave on substrate 12. This occurs when the stress components produced by the electric field in the piezoelectric substrate are substantially matched to the stress components associated with the surface-wave mode. Source 10, for example a portion of a television receiver, may produce a range of signal frequencies, but due to the selective nature of the arrangement only a particular frequency and its intelligence carrying sidebands are converted to a surface wave. More specifically, source 10 may be the tunable front end of a television receiver which selects a desired program signal for application to load 14 that, in this environment, includes those stages of a television receiver subsequent to the intermediate frequency selector which respond to the program signal in producing a television image and its associated audio program. The surface waves resulting in substrate 12, in response to energization of transducer 11 by the IF output signal from source 10, are translated along the substrate to output transducer 13 where they are converted to an electrical output signal for application to load 14.

In a typical television IF embodiment, utilizing PZT as the piezoelectric substrate, the stripes of both transducers 11 and 13 are approximately 0.5 mil wide and are separated by 0.5 mil for the application of an IF signal in the typical range of 40 to 46 megahertz. The spacing between transducer 11 and transducer 15 is on the order of 60 mils and the width of the wavefronts leaving transducer 11 is approximately 0.1 inch.

The potential developed between any given pair of successive stripes of electrode array 11 produces two waves traveling along the surface of substrate 14 in opposing directions as indicated by the arrows on each side of transducer 11 in FIG. 1. Similar arrows are included adjacent to the input transducers in the other figures. When the distance between the stripes is one-half of the acoustic wavelength of the wave at the desired input frequency relative maxima of the output waves are produced by piezoelectric transduction in output transducer 13. For additional selectivity, an increased number of electrode stripes are added to the comb patterns of transducer 11 and 13. Further modifications and adjustments are described in the aforementioned DeVries application for the purpose of particularly shaping the response presented by the filter to the transmitted signal.

With input transducer 11 composed of electrodes having an effective interaction length $L_T$, the wavefronts launched by transducer 11 would ideally propagate along a path 16 of constant and equal width. In practice, however, the wavefronts change in width during propagation, diverging slightly as indicated by dashed lines 17. Accordingly, for optimum interaction with the wavefronts, the electrodes of transducer 13, without more, desirably have a length corresponding to the width of the actual propagation path. As indicated in the introduction, however, an increase in the lengths of the electrodes in transducer 13 results in a decrease in the real impedance presented by that transducer.

To the specific end in FIG. 1 of permitting the use of an output transducer having shorter electrode lengths, and thus presenting a higher real impedance, an acoustic lens 20 is disposed on substrate 12 in the path of wave propagation between input transducer 11 and output transducer 13.

Lens 20 is formed by depositing on the surface of substrate 12 a lens pattern of a material that exhibits an acoustical refractive index greater than one. That is, the material, a metal such as aluminum or a non-metallic substance such as a lacquer, is one which effects a decrease in the velocity of propagation of the acoustic surface waves transmitted through it.

Analogously to the case of utilizing lenses with optical energy, lens 20, which in FIG. 1 is represented as of a double-convex shape, results in the acoustic waves being converged toward a focal point 21. To prevent reflections of the surface wave energy at the right hand edge of substrate 12, an acoustic wave absorbing substance 22, such as rubber cement or wax, may be placed on the surface of substrate 12 in the region including or ahead of focal point 21.

Thus, the surface wavefronts between lens 20 and focal point 21 decrease in width. Consequently, output transducer 13 may be located anywhere between lens 20 and focal point 21 with the length $L_R$ of the active portions of its electrodes selected to achieve maximum interaction with the acoustic surface waves. At the same time, that location may be selected to obtain such maximum interaction while obtaining a length $L_R$ that results in the desired impedance across output transducer 13. On the other hand, when the distance between input transducer 11 and output transducer 13 is fixed by consideration of the required time delay through the filter, lens 20 is a parameter that may be changed to achieve the desired degree of convergence of the wavefronts; again, this permits the use of electrode lengths in output transducer 13 that result in the desired transducer impedance while at the same time resulting in interaction with the acoustic wavefronts.

In use in television and other communications environments, difficulty sometimes is encountered with direct feedthrough, by capacitive coupling, of signal energy from the input transducer to the output transducer. Such coupling advantageously may be reduced by utilizing lens 20 additionally as an electrostatic shield. To this end, the material of which lens 20 is formed is metallic and the material is connected to the same plane of reference potential as either the input or output transducer. As specifically shown, both lens 20 and input transducer 11 are connected to ground. This same feature is applicable to the other embodiments of the invention yet to be described, although it is not specifically illustrated therewith. In practice, the dielectric layer is disposed on top of a previously deposited metallic layer which is connected to ground.

Figure 3:
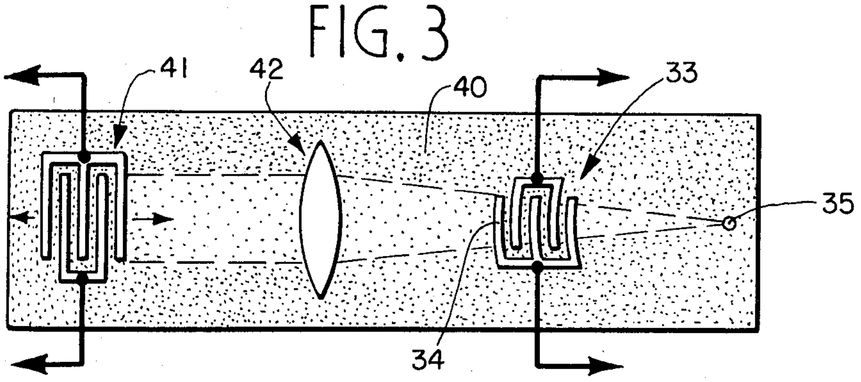
FIG. 3 is a diagram of still another embodiment of a surface-wave filter.

As mentioned above, input transducer 11 actually launches acoustic surface waves in opposing directions, only the wave proceeding in the direction to the right having been utilized in FIG. 1. The waves propagated in the opposite direction may be absorbed by disposing a wave-attenuation material on the surface of substrate 12 to the left of input transducer 11. Alternatively, the left-hand end surface of substrate 12 may be serrated in order to disperse the acoustic waves launched in that direction. In any event, it is in many cases desirable to avoid reflection of those waves launched by and traveling to the left of input transducer 11 in order to prevent their reflection back through the active components of the filter. It will be seen that the same considerations apply in the case of FIGS. 3 and 4.

Figure 2:
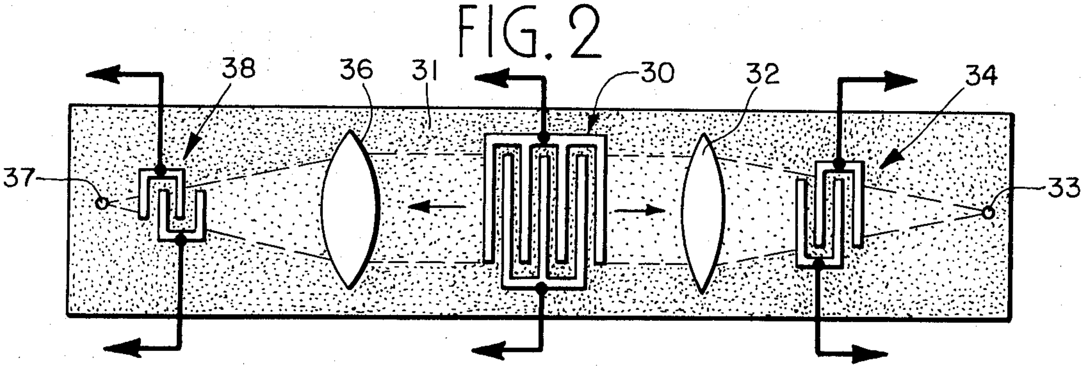
FIG. 2 is a diagram of an embodiment of a surface-wave filter alternative to that of FIG. 1.

A different approach with respect to the surface wave launched to the left of the input transducer, disclosed in the aforesaid DeVries application, involves the use of a second output transducer located to the left of the input transducer, that is to say, on the side opposite the first output transducer. This is illustrated in FIG. 2 wherein an input transducer 30 disposed on a piezoelectric substrate 31 launches acoustic surface waves to the right through an acoustic lens 32 which converges the wavefronts to a focal point 33. Disposed between lens 32 and focal point 33 is a first output transducer 34. This much of the filter of FIG. 2 is essentially the same as the filter arrangement of FIG. 1.

Acoustic surface waves launched by input transducer 30 to the left in FIG. 2 are transmitted through a second acoustic lens 36 to a focal point 37. A second or additional output transducer 38 is disposed on the surface of substrate 31 between focal point 37 and lens 36. The active lengths of the electrodes in both output transducers 34 and 38 preferably are selected to achieve maximum interaction with the approaching surface waves. In this case, the electrode lengths in output transducer 38 are significantly smaller than those of the other output transducer 34 so that the impedance presented by output transducer 38 is substantially larger. Consequently, the two output transducers 34 and 38 may be utilized to feed electric signals to separate output circuitry having different impedance levels matched by transducers 34 and 38, respectively. Where, for example, equal wave-transmission delay times are desired between the input transducer and the two output transducers, lens 36 is thicker as shown. This permits use of the smaller width for output transducer 38 as compared with that of output transducer 34. An acoustic-wave-absorbing material may be deposited on substrate 31 at or in front of each of focal points 33 and 37 in order to prevent unwanted reflections of that portion of the wave energy which is transmitted past the output transducers.

When the piezoelectric substrate is a transversely isotropic ceramic material, such as PZT, it is preferred that the output transducer have its electrodes curved in order to match the curved shape of the acoustic wavefronts. Accordingly, the surface-wave filter in FIG. 3 utilizes a substrate 40 of such material on which is formed an input transducer 41, an acoustic lens 42 and an output transducer 34. The operation of input transducer 41 and lens 42 is the same as that described with respect to the embodiment of FIG. 1. In this case, however, output transducer 43 includes interleaved conductive electrodes 34 which are curved, concavely with respect to a focal point 35, to correspond in shape to the configuration of the acoustic waves emerging from lens 42. This modification is equally applicable to any of the other embodiments when constructed of a transversely isotropic material.

Figure 4:
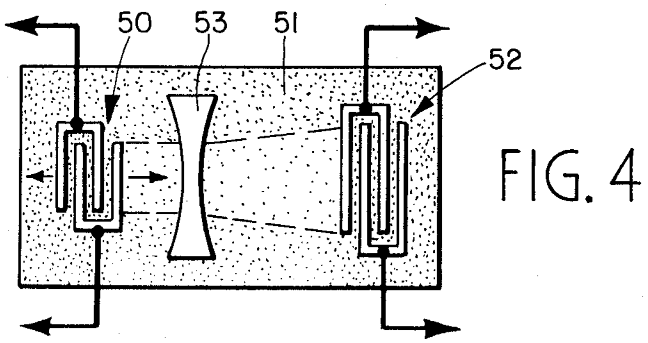
FIG. 4 is a diagram of a still different embodiment of a surface-wave filter.

In the arrangement of FIG. 4, an input transducer 50 is disposed on the surface of a piezoelectric substrate 51 at the other end of which is an output transducer 52. An acoustic lens 53 is disposed on the surface of substrate 51 between input transducers 50 and 52. As will be recognized from the drawing, lens 53 is of the double-concave variety so as to increase the divergence of the wavefront leaving the lens. Consequently, the length of the electrodes in output transducer 52 desirably is longer than that of the electrodes in input transducer 50, in correspondence with the increased wavefront widths at the output transducer. Thus, the arrangement of FIG. 4 is applicable, for example, where external circuit requirements dictate that the impedance presented by the output transducer be smaller than that of the input transducer.

It will be seen that a substantial latitude of flexibility is afforded to meet the impedance requirements of specific arrangements. Through variation of transducer electrode lengths, transducer location, refractive power of the acoustic lens and type of lens, different transducer impedances may be obtained while obtaining full interaction between the acoustic waves and the transducers. Alternatively, the inter-transducer spacings may be selected as desired for other purposes while achieving full wave interaction at each transducer. The resulting device is entirely of a solid-state nature capable of being fabricated with integrated-circuit techniques.

Although particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A signal transmission device comprising:

a medium propagative of acoustic surface waves;

means including an input transducer responsive to input signals for launching acoustic surface waves along a predetermined path on said medium, the fronts of said waves having a width which changes during propagation;

an acoustic lens, including a material on said medium exhibiting an acoustical refractive index greater than one, disposed in said path for modifying the width change of said fronts;

and means including an output transducer responsive to said acoustic surface waves transmitted through said lens for developing an output signal.

2. A device as defined in claim 1 in which said material decreases the velocity of propagation of said waves so that said lens is convergent.

3. A device as defined in claim 1 in which said lens converges said acoustic waves to a focal point further along said path than said output transducer, and including an element attenuative of said surfaces waves disposed on said medium in the vicinity of said focal point.

4. A device as defined in claim 1 in which said output transducer includes a series of interleaved electrodes disposed across the path of said waves, and in which the distance of said output transducer along said path beyond said lens as well as the length of said electrodes are selected to obtain a predetermined impedance for said output transducer while optimizing the interaction of said output transducer with said surface waves.

5. A device as defined in claim 1 in which at least one of said input and output transducers is coupled to a plane of reference potential, and in which said acoustic lens also is coupled to said plane of reference potential.

6. A device as defined in claim 1 in which said lens is convergent and in which said output transducer has a width across the path less than that of said input transducer.

7. A device as defined in claim 1 in which said lens is divergent and in which said output transducer has a width across the path of said waves greater than that of said input transducer.

8. A device as defined in claim 4 which includes a second output transducer similar to the first output transducer but spaced on said medium on the other side of said input transducer than said first output transducer, which further includes a second acoustic lens disposed in the propagation path between said input transducer and said second output transducer, and in which the electrodes of said second output transducer have a different length from those of said first output transducer so that said second output transducer presents an impedance substantially different from that of said first output transducer.

9. A device as defined in claim 8 in which said second acoustic lens exhibits a refractive power substantially different from that of the first acoustic lens.

10. A device as defined in claim 1 in which said acoustic lens curves the fronts of said acoustic waves and in which interactive portions of said output transducer are correspondingly curved.

11. A signal transmission device comprising:

a medium capable of propagating acoustic surface waves;

means including an electro-acoustic input transducer responsive to electrical input signals for launching acoustic surface waves along a predetermined path on a surface of said medium;

acoustic surface wave lens means for focusing acoustic surface waves on said medium, comprising a substantially two-dimensional lens pattern disposed on said surface in said path to intercept surface waves propagated therealong and being composed of a material which conducts surface waves at a velocity different from the velocity of propagation of surface waves on said medium; and means including an electro-acoustic output transducer on said surface of said medium responsive to said acoustic surface waves transmitted through said lens pattern for developing electrical output signals.

* * * * *